Sept. 25, 1951 J. A. RAJCHMAN ET AL 2,568,932

ELECTRONIC CUMULATIVE ADDER

Filed Sept. 27, 1947 2 Sheets-Sheet 1

Inventors
Jan A. Rajchman
& George W. Brown
By
C.D. Tuska
Attorney

ELECTRONIC CUMULATIVE ADDER

Filed Sept. 27, 1947 2 Sheets-Sheet 2

Inventors
Jan A. Rajchman
& George W. Brown
By
C. D. Tuska
Attorney

Patented Sept. 25, 1951 2,568,932

UNITED STATES PATENT OFFICE 2,568,932

ELECTRONIC CUMULATIVE ADDER

Jan A. Rajchman, Princeton, N. J., and George W. Brown, Ames, Iowa, assignors to Radio Corporation of America, a corporation of Delaware Application September 27, 1947, Serial No. 776,439

5 Claims. (Cl. 235—61)

Figure 1:
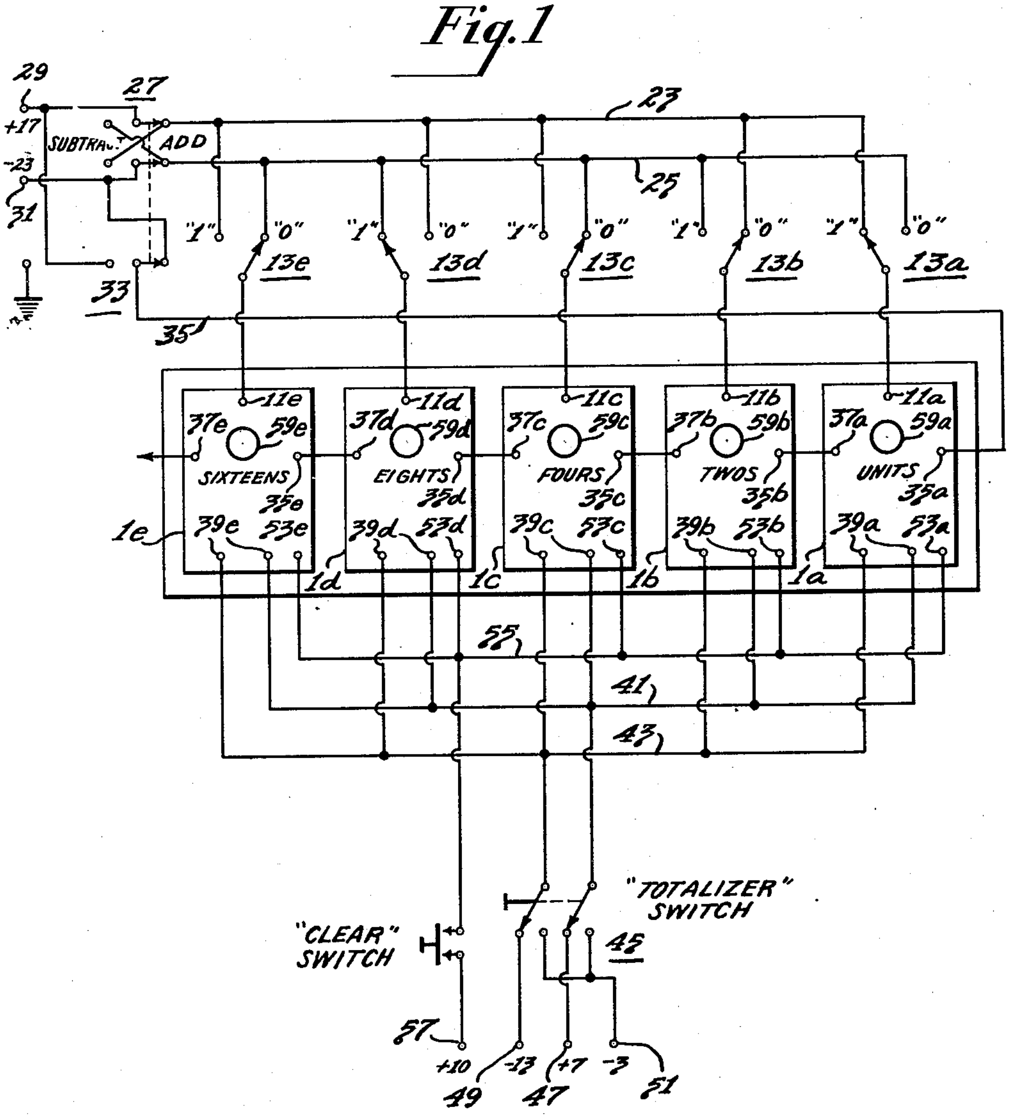

This invention relates to electronic computing systems of the type disclosed in our copending application, Serial No. 757,262, filed June 26, 1947, for Improvements in Electronic Adder, now Patent No. 2,503,765, issued April 11, 1950. It has for its principal object the provision of an improved computing circuit and method of computation in which successive processes of addition and subtraction are readily performed and in which the accumulated total may be held indefinitely. In this respect the invention is comparable to an adding machine in which numbers are first set up by operating the appropriate keys in the various decimal places, and then transferred to an accumulator, after which the second, third and fourth numbers are entered and transferred in turn. The total then appears on the indicator, where it is retained indefinitely until the device is "cleared."

In the invention described and claimed in our pending application identified above, provision is made for the addition of two numbers only, the indicator showing the sum or difference of the two numbers which are entered on separate sets of keys. The present invention employs the same principle of operation as is employed in the earlier device, but includes a single set of keys on which the numbers are entered in succession, the numbers so entered being transferred to an accumulator or "totalizer" device which at all times indicates the total of the individual numbers which are added or subtracted in a given sequence, together with means for "clearing" the computer.

As in our earlier application, all computations are performed in terms of numbers and in the binary system of numeration in which a number is expressed as a sum of powers of two multiplied by coefficients which are either zero or one. Thus integers "$x$" are represented by the series $$x = A_0(x)2^0 + A_1(x)2^1 + A_2(x)2^2 + \ldots + A_n(x)2^n + \ldots$$

where the coefficient $A_n(x)$ is either zero or one.

Using the usual order of writing digits, as in the decimal system, the $2^0$ place is on the right, and the $2^1$, $2^2$, . . . etc., places successively to the left. In the decimal system the "units," "tens," "hundreds," etc., places read from right to left. Similarly in the binary system the places, from right to left, are "units," "twos," "fours," "eights," etc.

Thus, the number 6 may be written

0110 which states that the number contains no units, one "two" and one "four," for a total of 6. Similarly, the number 7 would be written

0111 which adds one "unit" to the number six for a total of 7.

Addition in the binary system is done as in the decimal system taking into account the "carry-over." Thus the sum of 6 and 7 is obtained as follows:

$$\begin{array}{rl} \text{carry over} = & \\ 6 & = 0110 \\ 7 & = 0111 \\ \hline 13 & = 1101 \end{array}$$

A generalization of the addition of two binary numbers $x$ and $y$ may be written:

$$\begin{array}{cccc} \overset{c_n}{\overline{\quad\quad}} & \overset{c_{n-1}}{\overline{\quad\quad}} & \overset{c_1}{\overline{\quad\quad}} & \overset{c_0}{\overline{\quad\quad}} \\ \cdots A_n(x) & \cdots A_2(x) & \cdots A_1(x) & \cdots A_0(x) \\ \cdots A_n(y) & \cdots A_2(y) & \cdots A_1(y) & \cdots A_0(y) \\ \hline \cdots A_n(x+y) & \cdots A_2(x+y) & \cdots A_1(x+y) & \cdots A_0(x+y) \end{array}$$

where $A_n(x)$ and $A_n(y)$ are either zero or one.

In binary systems of electronic computation, all digits are represented by one or the other of two voltages $V_1$ and $V_2$, which may have any arbitrarily assigned value. In the present instance, however, we prefer to utilize two voltages approximately equal to +17 and −23, for reasons which will appear subsequently. In a given stage of the computer +17 volts may be chosen to represent the cipher "zero," while −23 volts may be chosen to represent the cipher "one." Within a given stage, this arbitrary convention must be adhered to uniformly. However, for convenience it is preferred to alternate this convention from stage to stage, since this greatly simplifies the apparatus. Consequently, it is to be understood that in all odd numbered stages or digital places of the particular apparatus illustrating this invention, +17 volts will represent the cipher "zero," while in all even numbered stages +17 volts will represent the cipher "one."

It is therefore a further object of this invention to provide an improved method of and apparatus for indicating the total of the sum or difference of a plurality of numbers.

A still further object of this invention is to provide an electronic adding or subtracting machine with an accumulator for holding and/or indicating the cumulative sum of a plurality of numbers of positive or negative sign.

A still further object is to provide an improved electronic adding machine which is positive and certain in its action, and economical to manufacture.

A still further object of this invention is the provision of an all electronic adding machine capable of performing a sequence of additions and subtractions in the binary system of computation.

In our copending application referred to above, a full explanation has been given of the method of subtracting one number from another by reversing or interchanging the voltages representing the respective ciphers of the number to be subtracted, adding the two numbers, dropping the number in the highest digital place and adding one. The same system is employed in connection with the present invention.

In brief, the present invention incorporates a plurality of stages, one for each binary place. The number of stages employed is determined by the desired capacity of the device. Each stage is provided with: (a) a key or selector switch for applying the voltage representative of the binary number for the digital place in question to (b) an adder which combines the selected voltage with the carry-over voltage from the preceding stage and a voltage representative of the cipher then held in the corresponding stage of the accumulator, to produce a resultant voltage which will change the cipher in the accumulator, if required, and a carry-over voltage for the succeeding stage, (c) an accumulator which will assume a condition indicative of the new value of the cipher for the accumulated sum, and (d) a totalizer switch which will transfer the information produced by the adder to the accumulator. A switch is also provided for clearing the accumulator when a given computation has been completed.

The novel features that are considered characteristic of this invention are set forth with particularity in the appended claims. The invention, both as to its organization and method of operation, as well as additional objects and advantages thereof, will best be understood from a consideration of the following description and the accompanying drawings, in which Fig. 1 is a block diagram of an accumulative binary computer in accordance with this invention, and Fig. 2 is a circuit diagram of two elements of the system illustrated in Fig. 1, all other elements being like one or the other of the two which are shown in detail.

Figure 2:
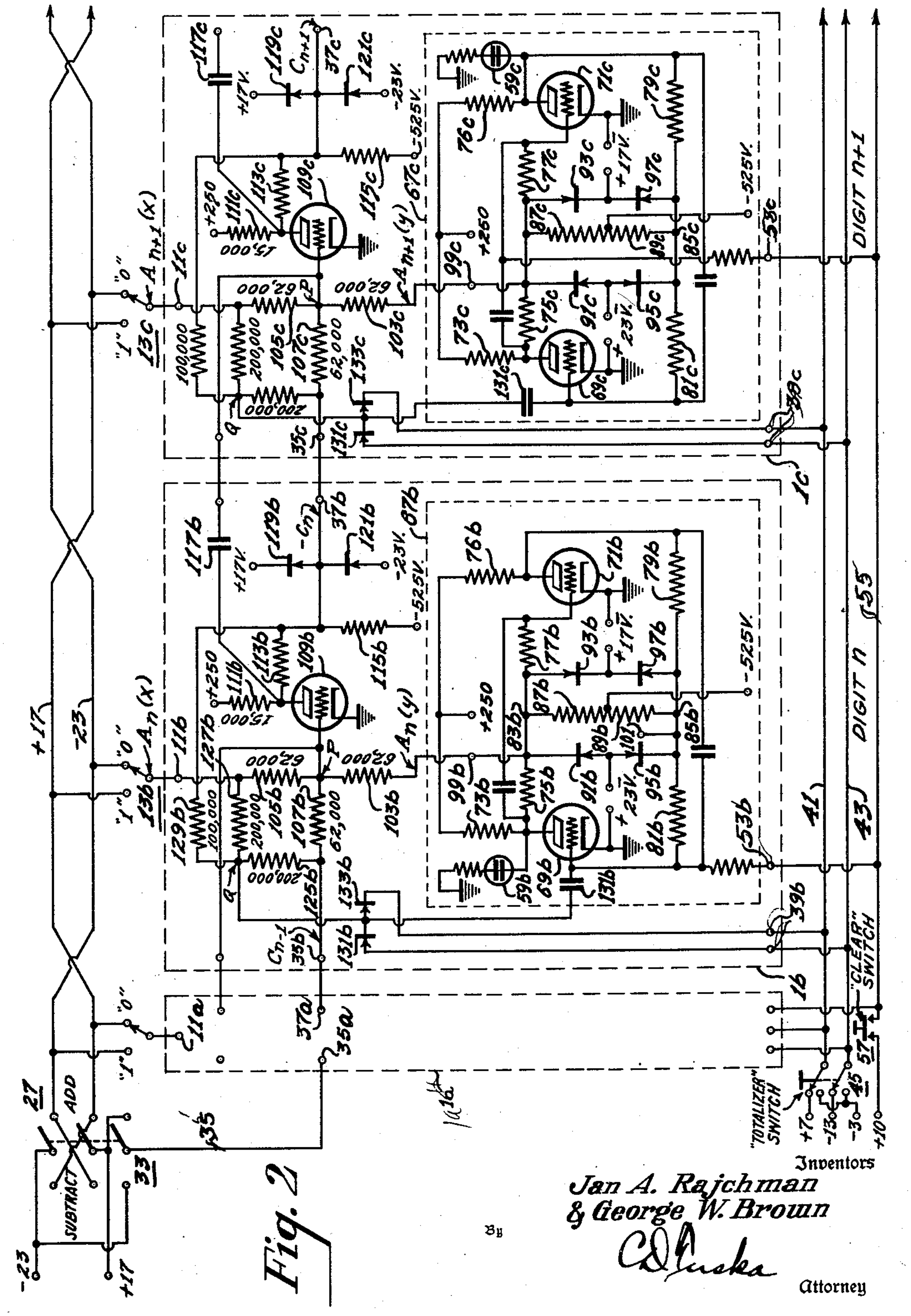

Referring to Fig. 1, there is illustrated in diagrammatic form an electronic computer which consists of a number of computer stages 1*a* to 1*e*, reading from right to left, which correspond to the "units," "twos," "fours," "eights" and "sixteens" digital places in the binary systems of computation, respectively. The actual number of stages employed will depend upon the desired capacity of the computer, it being understood that one stage will be required for each digital place. For the purpose of illustration, only five stages have been shown. Since each stage is connected identically to the external sources of voltage and the internal circuit connections of all odd numbered stages are identical, as are the circuit connections of all even numbered stages, it will be appreciated that the system may be extended to any number of stages desired.

Each stage of the computer is connected by the respective input terminals 11*a* to 11*e* to a like number of single-pole double-throw switches 13*a* to 13*e*. The fixed contacts of these switches are connected to a pair of leads 23, 25, in alternate fashion. That is, the right hand contacts of switches 13*a*, 13*c* and 13*e* are connected to lead 25, while the left hand contacts of switches 13*b* and 13*d* are connected to lead 25. Leads 23 and 25 are connected through a reversing switch 27 to a pair of terminals 29, 31 to which fixed potentials of +17 and −23 volts are to be applied from a source not shown. These voltages, and all other voltages referred to hereinafter are with respect to ground.

Switch 27 is operable to two positions. When moved to the right the potentials are such that the system operates to add, and when moved to the left the system will subtract. An additional single-pole double-throw switch 33 is mechanically coupled to and operable with switch 27. The latter switch connects lead 35 from the carry-over input terminal 35*a* to the terminal 29 or the terminal 31, depending upon the position of the switch.

Each carry-over output terminal 37 is connected to the carry-over input terminal of the next succeeding stage, in the ascending series. Totalizer input terminals 39*a* to 39*e* are all connected symmetrically to a pair of leads 41, 43 which are connected by means of totalizer switch 45 either to terminals 47, 49, respectively, or to a common terminal 51. A D. C. voltage of +7 volts is applied to terminal 47, −13 volts to terminal 49, and −3 volts to terminal 51.

Clearing input terminals 53*a* to 53*e* are all connected to lead 55, and through a "clear" switch to a terminal 57 to which a D. C. potential of +10 volts is applied.

Each computer stage includes an indicator of any convenient form, such as lamps 59*a* to 59*e*. As convenient, it may be considered that the cipher "zero" is indicated when the lamp is out, and the cipher "one" indicated when the lamp is lit. Thus, by observing the condition of the lamps, the total held in the accumulator may be determined. It is to be understood, however, that other forms of indicators may be employed, or the voltages may be employed to control other apparatus without, or in addition to, the visual indication.

Before describing the circuit elements of the computer, the general method of operation may be stated. Assuming a column of numbers is to be added, the machine is first "cleared" by momentarily pressing clear switch 57. If any lamps were previously lit, they will go out, indicating "zero" in all stages of the computor. Switch 27 is then placed in the "add" position. Switches 13 are then placed in the proper positions to represent the ciphers of the various binary places of the first number. For example, if the first number is 1001, using the binary notation, switches 13*a* and 13*d* will be moved to the left or "1" position, and all other switches will be moved to the right or "zero" position, as illustrated. The totalizer switch 45 is then momentarily operated. Lamps 59*a* and 59*d* will then light up, indicating that the number has been transferred to the accumulator.

Switches 13 are then set for the second number, say 101, by moving the switches 13 as necessary. The totalizer switch is then momentarily pressed again, transferring the second number to the accumulator and adding it to the number already present. The sum of the two numbers is 1110. Consequently, lamp 59*a* will go out, lamps 59*b* and 59*c* will light up, while lamp 59*d* will remain lit as before. This process may then be repeated as many times as desired so long as there are sufficient stages available to represent the digital places in the sum.

To subtract a number from another, the minuend is transferred to the accumulator, if it is not already present, and then switch 27 is moved to the left or "subtract" position. Switches 13 are then set to the subtrahend and the totalizer switch 45 operated. The conditions of the lamps 59 then indicate the value of the difference, it being understood that the cipher "one" in the highest digital place is to be ignored. It may be noted here that in the "add" position of switch 27 a voltage representing "zero" is applied to the carry-over input terminal 35a. In the "subtract" position, however, a "one" is applied to this terminal since, as pointed out more fully in our copending application, it is necessary to add the cipher one when this method of subtraction is employed.

It should also be understood that the various control switches may readily be replaced by electronic switches in the manner also described in our above-identified copending application.

Referring now to Fig. 2, the detailed circuit connections of two stages $n$ and $n+1$ of the computer are shown, it being assumed that the $n$th stage is, for example, the even-numbered stage 1b of Fig. 1, and the $n+1$th stage is the following or odd-numbered stage 1c. All even-numbered stages will then be identical to stage 1b, while all odd-numbered stages will be identical to stage 1c. Since the two are substantially identical, only one will be described in detail, the corresponding identical parts being identified by the same reference numerals bearing suitable lettered subscripts. Their differences will also be pointed out. For simplicity, when referring to identical components generally the lettered subscripts will not be used. When referring to a particular one of the several identical components, the lettered subscript will be employed for purposes of identification.

Two tubes 69 and 71, and their associated components within the dotted line 67, comprise an electronic switch or accumulator. Tubes 69 and 71 have their cathodes grounded and their plates connected through resistors 73 and 76 to a suitable source of positive potential. The plate of tube 69 is connected to the grid of tube 71 through two resistors 75 and 77. The plate of tube 71 is connected to the grid of tube 69 through two resistors 79 and 81. These resistors may be shunted by a small capacitor to speed up the transfer of the condition of operation.

The midpoint 83 of resistors 75 and 77 is connected to a source of high voltage negative potential through resistor 87. The mid-point 85 of resistors 81 and 79 is connected to the same source of negative potential through resistor 89. Midpoint 83 is also connected through a rectifier 91 to a source of fixed negative potential of −23 volts and through a rectifier 93 to a source of fixed positive potential of +17 volts. Similarly, mid-point 85 is connected through a rectifier 95 to the −23 volt and source and through a rectifier 97 to the +17 volt source.

The electronic switch 67 is basically a flip-flop, sometimes called a trigger circuit, having two conditions of stability. That is, either tube 69 is conducting and tube 71 cut off, or vice versa. The existing condition can be reversed by driving the grid of either tube positive or negative as may be required.

Each electronic switch 67 includes means for limiting the output voltages to two fixed predetermined values, such as −23 and +17 volts, although other values may be produced as desired. The particular reason for selecting these values will appear subsequently. Voltage standardization is accomplished by restricting the swing of the output by rectifiers. The circuit constants are so selected that in the absence of the rectifiers the potentials of points 83 and 85 would swing far more positive and negative, respectively, than the potentials to which they are to be limited.

Assuming that tube 69 is conducting, and tube 71 cut off, the potential at output terminal 99, which is connected to midpoint 83, will seek a potential more negative than −23 volts due to the effect of resistor 87 and the −525 volt source. When this voltage is exceeded, however, rectifier 91 becomes equivalent to a very low impedance and holds the output at the −23 volt level. Rectifier 93 is connected oppositely so that it presents a high impedance to point 83.

At the same time, the potential of output terminal 101 seeks a high positive level, since the plate of tube 71 is at a high potential. Rectifier 97, however, conducts as soon as the potential tends to exceed +17 volts, and holds the output at this value. Rectifier 95 is so connected that it presents a high impedance to the ouput terminal 101.

When the conditions of conductivity of tubes 69 and 71 are reversed, the potential at output terminal 99 is held at +17 volts by rectifier 93, while the potential at output terminal 101 is held at −23 volts by rectifier 95.

Indicator lamp 59b, preferably of the gaseous discharge variety, is connected between the plate of tube 69b and ground through a suitable current limiting resistor. The indicating lamp 59c of the next stage, however, is connected to the plate of the other tube 71c. Consequently, lamp 59b will light when the left-hand tube 69b is non-conducting, while lamp 59c will light only when the right-hand tube 71c is non-conducting. When these tubes are conducting the drop in the respective plate resistors 73b and 73c is such that the plate voltage is insufficient to cause the lamps to ignite.

The electronic switch has two functions: (1) to assume one condition of conductivity or the other in accordance with the polarity of the voltage applied by the operation of the "totalizer" switch 45, and to produce a visual or other indication of its condition, and (2) to produce a voltage at terminal 99 indicative of its condition. This voltage has one of two standard values +17 or −23, and represents the numerical value of the cipher represented by the condition of the switch at the binary place represented. Thus, when the lamp 59b is non-conducting, indicating "zero" for that binary place, the voltage at terminal 99b will have its most negative value, i. e., −23 volts. Consequently, for the particular stage 1b, this voltage will be considered as representing "zero." It should also be noted at this point that the voltages on the various terminals 99 together represent the coefficients of $2^k$, where $k$ is 0, 1, 2, . . . $n$, in the equation $$y=A_0(y)2^0+A_1(y)2^1+A_2(y)2^2+\ .\ .\ .\ A_n(y)2^n$$

Since the electronic switches 67 have two conditions of stability, and assume one condition or the other as required, they are, effectively, accumulators or memories, and serve to hold the information provided by the computer itself which will now be described.

Addition is accomplished by the resistance averaging method of our earlier application. To reproduce the binary addition of two ciphers it is necessary to consider the values of the two ciphers $A_n(x)$ and $A_n(y)$ and the value of the carry-over $C_{n-1}$. Each of these ciphers may be either "one" or "zero." Thus three separate voltages must be combined, each capable of variation between two fixed values, +17 and −23 for example. The voltage $A_n(y)$ is available at terminal 99, as stated above. The voltage $A_n(x)$ is provided at terminal 11 by selector switch 13, while the carry-over voltage $C_{n-1}$ is available at input terminal 35. These three points are therefore connected through resistors 103, 105 and 107, respectively, to a common point P. The resistors are all of equal value, say 62,000 ohms.

Point P is connected to the grid of carry-over tube 109, the plate of which is connected through a plate loading resistor 111 to a source of plate potential of, say, 250 volts. The plate is also connected through an output resistor 113 to (1) the carry-over output terminal 37, and (2) a source of high negative potential, say, −525 volts, through resistor 115. In addition, the plate of each tube 109 may be coupled to the grid of each succeeding tube 109 by a small capacitor 117, to speed up the action.

Since three voltages varying between the same limiting values are applied to the ends of the three resistors which are connected to point P, the voltage at point P will have the average values indicated in Table I below, depending on whether none, one, two or three of the voltages are +17, the others being −23. The carry-over voltage $C_n$ which results is also shown.

*Table I*

| Voltages which are +17 v. | Point P Voltage | $C_n$ |
|---|---|---|
| none | −23 | +17 |
| one | −10 | +17 |
| two | +4 | −23 |
| three | +17 | −23 |

Tube 109 has such a characteristic that with a negative grid voltage of −23 or −10 volts it will be completely cut-off, or at least cut off to such an extent that the plate voltage will exceed +17 volts. The voltage at terminal 37 will therefore reach a maximum value of +17 volts, due to the limiting action of rectifier 119, when not more than one of the three applied voltages is +17. Similarly, the voltage at terminal 37 will reach a minimum value of −23 volts when two or more of the applied voltages are +17 volts, because then tube 109 is conducting, the plate voltage drops, and the negative potential applied through resistor 115 tries to pull the voltage at this point to a low negative value, the actual value, however, being limited to −23 volts by the action of rectifier 121.

Remembering that in the stage 1b the convention has been adopted that the cipher one is represented by +17 volts, and the cipher zero by −23 volts, and that this convention is reversed in the following stage 1c, it may be observed that when none or only one of the numbers in the digital place considered is a one, a carry-over of zero is introduced into the succeeding stage. However, if more than one of the numbers is a one, then a carry-over of one is provided. It will be observed that this is in accordance with the procedure followed in the addition of two binary numbers.

The carry-over voltage $C_{n-1}$ from the preceding stage is also applied through a resistor 125 to point Q, which point is also connected to terminal 11 through resistor 127 and to terminal 37 through resistor 129. Resistors 125 and 127 have the same value, say, 200,000 ohms, while resistor 129 has one-half this value. Consequently, the potential of point Q is determined by the value of three voltages, $C_{n-1}$, $A_n(x)$ and $C_n$, but since resistor 129 has half the value of the other resistors the effect of the voltage $C_n$ is twice as great as that of the other voltages. Also, since it is reversed in sense, it is effectively a voltage $-2C_n$.

It may now be seen that the voltage at point Q depends on (*a*) the carry-over voltage $C_{n-1}$ from the preceding stage; (*b*) the voltage $A_n(x)$ representing the number to be added to the number in the accumulator; and (*c*) the voltage $A_n(y)$ representing the number then in the accumulator acting on point P and thus affecting the value of $C_n$ as shown in Table I.

In the binary addition of digits of a given binary place of two numbers $x$ and $y$, for each of the two possible values of the $y$ digit, zero, or one, there are four possible combinations of the $x$ digit and the carry-over. That is, both may be zero, both may be one, or either one may be zero and the other may be one. Stating this in tabular form in which the digits are represented by their voltage equivalents, we may observe that the potential at point Q will be as shown in Table II. For simplicity, the voltage $C_n$ has been shown twice, since it has twice the effect on the potential of point Q of any other voltage.

*Table II*

| (1) $A_n(y)$ | (2) $C_n$ | (3) $C_n$ | (4) $A_n(x)$ | (5) $C_{n-1}$ | (6) Point Q |
|---|---|---|---|---|---|
| −23 | +17 | +17 | −23 | −23 | −3 |
| −23 | −23 | −23 | +17 | +17 | −3 |
| −23 | +17 | +17 | +17 | −23 | +7 |
| −23 | +17 | +17 | −23 | +17 | +7 |
| +17 | +17 | +17 | −23 | −23 | −3 |
| +17 | −23 | −23 | +17 | +17 | −3 |
| +17 | −23 | −23 | +17 | −23 | −13 |
| +17 | −23 | −23 | −23 | +17 | −13 |

It should be noted that the values of $C_n$ are obtained from Table I, and the values of the voltages at point Q are the averages of the voltages in columns (2) to (5).

Point Q is coupled by a capacitor 131 to the grid of the left-hand tube 69, and is also connected to two rectifiers 131 and 133 which are, in turn, connected to leads 41 and 43, respectively. In its normal position switch 45 connects lead 41 to a source of potential of at least +7 volts, and lead 43 to a source of potential of at least −13 volts, these values being equal to or greater than the greatest potentials assumed by point Q so that both rectifiers are normally high impedances and do not affect the potential of point Q.

When the totalizer switch 45 is operated, leads 41 and 43 suddenly go to a potential of −3 volts. If point Q was previously at −3 volts its potential will not change. Consequently no pulse will be applied by capacitor 131 to the grid of tube 69 and therefore the condition of the accumulator, whatever it is, and hence of the indicator lamp 59, will not change. By observation it may be seen from Table II that this condition exists when the various voltages represent the following conditions:

(a) When $A_n(x)$, $A_n(y)$ and $C_{n-1}$ are all zero.

(*b*) When $A_n(y)$ is one and $A_n(x)$ and $C_{n-1}$ are zero.

(*c*) When $A_n(y)$ is zero and $A_n(x)$ and $C_{n-1}$ are both one. (In this case a carry-over of one to the next succeding binary place is produced.)

(*d*) When $A_n(y)$ is one, and $A_n(x)$ and $C_{n-1}$ are both one. (A carry-over of one is produced in this case also.)

The equivalence of the numerical addition of binary numbers and the electrical equivalent so far described is clearly evident.

Assume, next, that the potential of point Q is −13 volts. From Table II it can be observed that this condition only exists when the accumulator is set on one, and tube **69*b* is not conducting. When the totalizer switch 45 is operated the anode of rectifier 131 suddenly becomes positive with respect to its cathode, and the rectifier becomes a very low impedance. This causes the potential of point Q suddenly to go up from −13 volts to −3 volts. As a result a 10 volt positive pulse is applied to the grid of tube 69, causing it to conduct, and extinguishing tube 71. Lamp 59** then goes out, indicating that the value of the sum for the binary place concerned is now zero. This occurs only when $A_n(x)$ is one and $C_{n-1}$ is zero, or vice versa. This action is, therefore, fully equivalent to the process of numerical addition.

It has been shown, therefore, that the circuit illustrated fulfills all the necessary operations to perform the addition of two binary numbers in terms of voltages, and further that the sum is retained in an accumulator which constantly indicates the numerical equivalent, in binary numbers, of the total. The apparatus takes into account the production of a carry-over voltage for the succeeding stage and the carry-over voltage supplied by the preceding stage. Any number of computations may be made in succession, and the indicator lamps will indicate the total value of them all.

Switch 57 is then operated to clear the accumulator. By applying a positive pulse to the grid of tube **69*b*, and to the grid of tube 71*c*, and alternately to the right and left hand tubes of the various stages, the accumulators will all be placed in that condition which causes the indicator lamps 59** to go out, indicating that no numbers are held in the device.

It is to be understood that various other expedients are possible for obtaining the proper sense of the successive stages. Thus all the indicator lamps 59 may be connected to tubes 69, in one stage being connected as shown, and in the next stage being connected across the plate resistor. So also, instead of reversing the convention with alternate stages, the sense of the carry-over voltage may be reversed by including an additional coupling tube between terminals 37 and 35. In this case all stages will be identical.

Any number may be subtracted from the total in the accumulator by placing switch 27 in the "subtract" position, and proceeding as though the number were being added, as described above. In order to remove the cipher from the highest binary place as a result of this operation, a switch may be provided in the last stage which will apply a negative or positive pulse to the appropriate tube 69 or 71, as the case may be, to shift the condition of that stage only to a condition representative of the cipher zero. As indicated above, the "one" which is to be added to the "one's" place, is provided automatically by switch 33.

The time constants of the circuits should be arranged so that changes in the D. C. potential of point Q due to the operation of the setting switches do not appear as pulses on the grid of tube 69. The "totalizer" action, however, is made rapid by keeping the impedance of this circuit low. This can be ensured by including a low-pass filter (a series resistor and a shunt capacitor) in the lead between point Q and the rectifiers, or by placing a small capacitor between point Q and a source of fixed potential.

What we claim is:

1. An electronic computer comprising a plurality of accumulators connected in cascade, each having two stable conditions of operation, one condition of each accumulator being representative of a given value of a first cipher in a system of numeration and the other condition being representative of another value of said first cipher; means for producing a first plurality of voltages each having one value or another depending on the condition of a corresponding one of said accumulators; means for producing a second plurality of voltages, each having one value or another depending on the value of corresponding ciphers of a number to be added to the number represented by the conditions of said accumulators; means for combining each voltage of said first plurality of voltages with a corresponding voltage of said second plurality and a carry-over voltage from the preceding accumulator to produce a first plurality of average voltages; means for deriving from each average voltage a carry-over voltage for the succeeding stage; means for combining each voltage of said second plurality with the carry-over voltages from the respective preceding accumulators and with a voltage representative of the carry-over voltage for the succeeding stage to produce a second plurality of average voltages, the last of said combined voltages having twice the effect of each of the other of said combined voltages; and means for conditioning each of said accumulators in accordance with the values of respective ones of said second plurality of average voltages.

2. An electronic computer comprising a plurality of cascaded computer stages, each stage representing one place in the binary system of numeration and including the combination of an accumulator having two stable conditions of operation representing the ciphers "zero" and "one" respectively; a source of voltage $A_n(x)$ selectively adjustable to one or the other of two values representing the ciphers "zero" and "one"; means for producing a voltage $A_n(y)$ having one or the other of said two values depending on the condition of said accumulator; means for applying to each stage carry-over voltage $C_{n-1}$ from the preceding stage, said carry-over voltage $C_{n-1}$ having one or the other of said two values depending on whether the carry-over from said preceding stage is "zero" or "one"; means for combining the three voltages $A_n(x)$, $A_n(y)$ and $C_{n-1}$ to produce a resultant equal to their average; means for producing a carry-over voltage $C_n$ for the next successive stage having a value representative of "one" when none or only one of said three voltages has a value representative of "one" and a value representative of "zero" when more than one of said three voltages has a value representative of "one"; means for combining with said voltages $C_{n-1}$ and $A_n(x)$ a voltage dependent on the value of voltage $C_n$ and having twice the effect of either voltage $C_{n-1}$ or voltage $A_n(x)$ to produce a second resultant voltage; and means for conditioning said accumulator in accordance with the value of said second resultant.

3. A device of the character described in claim 2 in which said means for conditioning said accumulator includes a totalizer switch actuatable to transfer to said accumulator a pulse the amplitude and polarity of which is dependent upon the value of said second resultant.

4. An electronic computer comprising a plurality of cascaded computer stages, each stage representing one place in the binary system of numeration, each stage including, in combination, an accumulator having two stable conditions of operation, one condition representing the cipher "zero" and the other condition representing the cipher "one"; a source of voltage $A_n(x)$ selectively adjustable to one or the other of two values representing the ciphers "zero" and "one"; means for producing a voltage $A_n(y)$ having one or the other of said two values depending upon the condition of said accumulator; means for applying to each stage a carry-over voltage $C_{n-1}$ from the preceding stage, said voltage $C_{n-1}$ having one or the other of said two values depending on whether the numerical carry-over from said preceding stage is "zero" or "one"; means for combining the three voltages $A_n(x)$, $A_n(y)$ and $C_{n-1}$ to produce a resultant equal to their average; means including a discharge device for producing a carry-over voltage $C_n$ for the next successive stage having one or the other of said two values depending on whether the numerical carry-over to the succeeding stage is a "zero" or a "one"; means for combining with said voltages $C_{n-1}$ and $A_n(x)$ a voltage dependent on the value $C_n$ and having twice the effect of either of said $C_{n-1}$ and $A_n(x)$ voltages to produce a second resultant voltage having (1) a given value when both voltages $A_n(x)$ and $C_{n-1}$ are identical independently of the existing condition of the accumulator, (2) a more positive value than said given value when the voltages $A_n(x)$ and $C_{n-1}$ are not identical and said accumulator is in one condition of operation, and (3) a more negative value than said given value when the voltages $A_n(x)$ and $C_{n-1}$ are not identical and said accumulator is in the other condition of operation; means for applying said second resultant voltage to the anode of a first unidirectional device and to the cathode of a second unidirectional device; means including a switch connected to the cathode of said first device and to the anode of said second device for alternatively applying to said devices either (1) a pair of voltages which are respectively at least equal to the more positive and more negative values of said second resultant voltage or (2) a voltage equal to said given value; and a capacitor connected to the anode of said first device and the cathode of said second device for applying said second resultant voltage to a control element of said accumulator.

5. An electronic computer comprising a plurality of cascaded computer stages, each stage representing one place in the binary system of numeration and including the combination of an accumulator having two stable conditions of operation representing the ciphers "zero" and "one" respectively; a source of voltage $A_n(x)$ selectively adjustable to one or the other of two values representing the ciphers "zero" and "one"; means for producing a voltage $A_n(y)$ having one or the other of said two values depending on the condition of said accumulator; means for applying to each stage carry-over voltage $C_{n-1}$ from the preceding stage, said carry-over voltage $C_{n-1}$ having one or the other of said two values depending on whether the carry-over from said preceding stage is "zero" or "one"; means for combining the three voltages $A_n(x)$, $A_n(y)$ and $C_{n-1}$ to produce a resultant equal to their average; means for producing a carry-over voltage $C_n$ for the next successive stage having a value representative of "one" when none or only one of said three voltages has a value representative of "one" and a value representative of "zero" when more than one of said three voltages has a value representative of "one"; means for combining said voltages $C_{n-1}$, $A_n(x)$ and twice the value of $C_n$ to produce a second resultant voltage which has (1) a given value when both voltages $A_n(x)$ and $C_{n-1}$ are identical independently of the existing condition of the accumulator, (2) a more positive value than said given value when the voltages $A_n(x)$ and $C_{n-1}$ are not identical and said accumulator is in one condition of operation and (3) a more negative value than said given value when the voltages $A_n$ and $C_{n-1}$ are not identical and said accumulator is in its other condition of operation; and means for conditioning said accumulator in accordance with the value of said second resultant.

JAN A. RAJCHMAN.
GEORGE W. BROWN.

REFERENCES CITED

The following references are of record in the file of this patent:

UNITED STATES PATENTS

| Number | Name | Date |
|---|---|---|
| 2,404,047 | Flory et al. | July 16, 1946 |
| 2,404,250 | Rajchman | July 16, 1946 |
| 2,409,689 | Morton et al. | Oct. 22, 1946 |
| 2,425,131 | Snyder, Jr. | Aug. 5, 1947 |
| 2,445,215 | Flory | July 13, 1948 |